(12) United States Patent
Kim et al.

(10) Patent No.: US 6,771,000 B2
(45) Date of Patent: Aug. 3, 2004

(54) ELECTRIC ROTARY MACHINE AND POWER GENERATION SYSTEMS USING THE SAME

(75) Inventors: Houng Joong Kim, Hitachi (JP); Hiromi Inaba, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 109 days.

(21) Appl. No.: 09/988,054

(22) Filed: Nov. 16, 2001

(65) Prior Publication Data

US 2002/0117927 A1 Aug. 29, 2002

(30) Foreign Application Priority Data

Feb. 28, 2001 (JP) ........................................ 2001-053421

(51) Int. Cl.[7] .................................................. H02K 1/06
(52) U.S. Cl. ............. 310/209; 310/156.25; 310/156.24; 310/156.16
(58) Field of Search ....................... 310/156.25, 156.24, 310/156.16, 156.17, 156.18, 156.08, 156.12, 156.15, 209, 191, 114

(56) References Cited

U.S. PATENT DOCUMENTS 3,713,015 A * 1/1973 Frister .......................... 322/28
3,936,685 A * 2/1976 Glockner et al. ........... 310/209
4,484,083 A * 11/1984 Jefferies ....................... 290/45
5,821,710 A * 10/1998 Masuzawa et al. ......... 318/254
6,084,326 A * 7/2000 Nagai et al. .................. 310/80
6,541,877 B2 * 4/2003 Kim et al. .................... 290/44

FOREIGN PATENT DOCUMENTS

| JP | 6-141401 | 5/1994 |
| JP | 10-155262 | 6/1998 |
| JP | 10-327569 | 12/1998 |
| JP | 11-46471 | 2/1999 |
| JP | 11-69743 | 3/1999 |
| JP | 2000-201461 | 7/2000 |

* cited by examiner

*Primary Examiner*—Dang Le
(74) *Attorney, Agent, or Firm*—Dickstein Shapiro Morin & Oshinsky LLP (57) ABSTRACT

The present invention provides an electric rotary machine including a rotor having a field magnet provided on a shaft, the field magnet having magnetic poles of sequentially different polarities arranged in a rotational direction, a second field magnet with magnetic poles of sequentially different polarities arranged in a rotational direction wherein the second field magnet is rotatable on the shaft and displaced axially with respect to the first field magnet.

14 Claims, 8 Drawing Sheets

INTERIOR MAGNET TYPE

SURFACE MAGNET TYPE

FIG. 15

ELECTRIC ROTARY MACHINE AND POWER GENERATION SYSTEMS USING THE SAME

FIELD OF THE INVENTION

The present invention relates to an electric rotary machine using a magnet for a field, and particularly, to an electric rotary machine for a power generation system and a control method thereof.

DISCUSSION OF THE RELATED ART

In a conventional permanent magnet electric rotary machine, an inductive electromotive force E is determined by a constant magnetic flux $\Phi$ generated by a permanent magnet arranged in a rotor and a rotating angular velocity $\omega$ of an electric rotary machine. Specifically, when the rotating angular velocity $\omega$ (rotating speed) of the electric rotary machine increases, the inductive electromotive force of the electric rotary machine rises in proportion thereto. Hence, operation in a high rotation region is difficult. Conventionally, operation in the high speed was made possible by the field weakening control technique.

But, this technique has drawbacks due to the heat generation by a field weakening current and lowered efficiency.

In a prior art method, a mechanism making use of a centrifugal force using a spring and a governor, as a field weakening method of magnetic flux generated by a permanent magnet is utilized.

Also, the construction of a spring and a governor is complex and costly.

SUMMARY OF THE INVENTION

The present invention provides an electric rotary machine which allows ease of fabrication and enables a field weakening of magnetic flux generated by a permanent magnet. Further, the present invention provides a power generation system provided with a permanent magnet type electric rotary machine capable of obtaining high torque characteristics in a low rotation region, such as start of a heat engine, and high output power generation characteristics in a high rotation region.

In an object of the present invention an electric rotary machine including a rotor having a field magnet provided on a shaft is provided the field magnet comprising a first field magnet with magnetic poles of sequentially different polarities arranged in a rotational direction, a second field magnet with magnetic poles of sequentially different polarities arranged in a rotational direction and the second field magnet is rotatable on the shaft and displaced axially with respect to the first field magnet.

In another object of the present invention an electric rotary machine including a rotor having a field magnet provided on a shaft is provided the field magnet comprising a first field magnet with magnetic poles of sequentially different polarities arranged in a rotational direction, a second field magnet with magnetic poles of sequentially different polarities arranged in a rotational direction wherein the second field magnet is rotatable on the shaft and displaced axially with respect to the first field magnet and a composite magnetic field created by the field magnets is changed.

In yet another object of the present invention a power generation system and a turbine power generation system is provided utilizing the electric rotary machine of the present invention. Further, a method of controlling a field magnet in a electric rotary machine is provided.

BRIEF DESCRIPTION OF THE DRAWINGS

The above advantages and features of the invention will be more clearly understood from the following detailed description which is provided in connection with the accompanying drawings.

DETAILED DESCRIPTION OF THE INVENTION

Exemplary embodiment of the present invention will be described below in connection with the drawings. Other embodiments may be utilized and structural or logical changes may be made without departing from the spirit or scope of the present invention. Like items are referred to by like reference numerals throughout the drawings.

Figure 1:
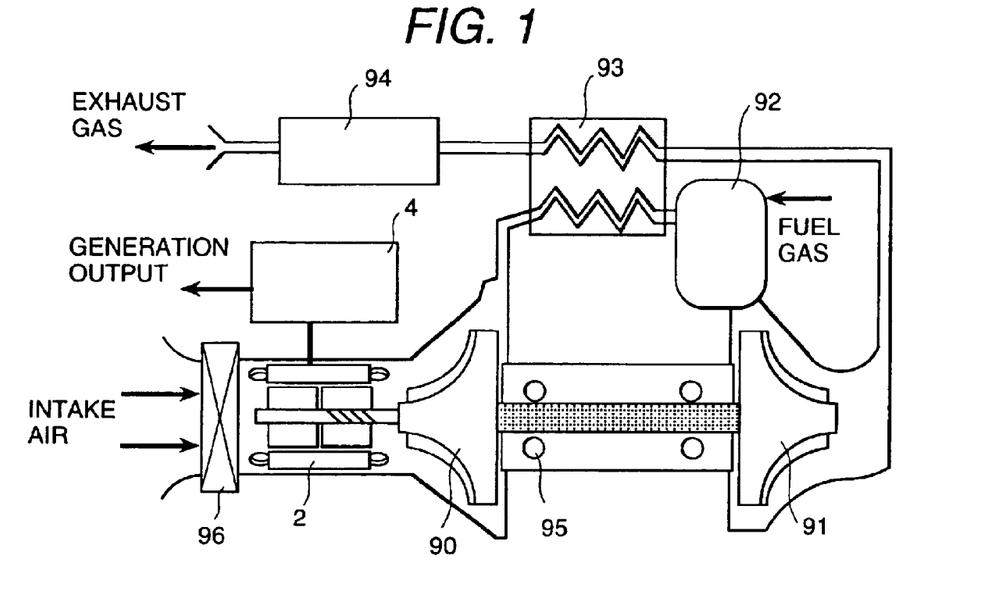
FIG. 1 illustrates an electric rotary machine and a turbine according to one embodiment of the present invention.

Referring now to the drawings, FIG. 1 comprises a compressor 90 and a turbine 91 mounted directly or indirectly on an electric rotary machine 2, a power converter 4 for controlling power of the electric rotary machine, a combustor 92, and a heat exchanger 93. While intake air passes through the electric rotary machine 2 and flows to the compressor 90 through a filter 96, it is noted that the construction may be employed in which air is taken in between the electric rotary machine 2 and the compressor 90. Further, in this embodiment, a waste heat recovery device 94 is mounted to improve the efficiency of the whole power generation system.

The permanent magnet type electric rotary machine 2 according to the present embodiment is able to start the turbine 91. In starting the turbine, when the turbine is increased in speed from 0 to a self-sustaining speed, the electric rotary machine is operated as an electric motor. The resistance torque increases rapidly as rotation starts, decreases at 15 to 20% of the rated speed (Ng), and assumes zero at 30 to 40% of the rated speed. The self-sustaining speed is about half of the normal operating speed of the turbine, and if the former is reached, it is a speed such that the turbine no longer requires assistance (torque of a motor) of a start device to assume a complete drive system, being operated as a power generator.

Figure 2:
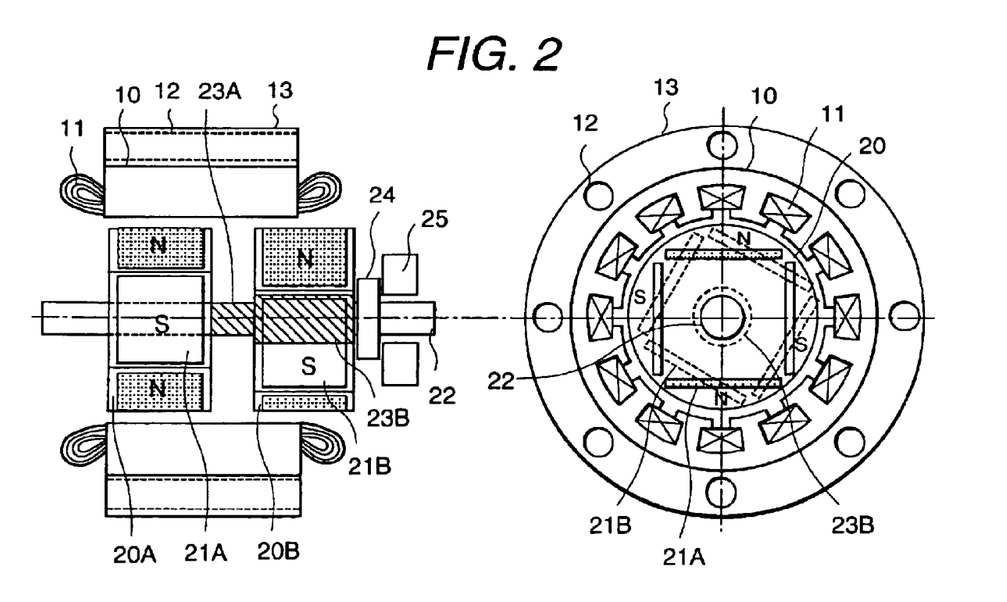
FIG. 2 illustrates the electric rotary machine of FIG. 1.

In FIG. 2, a stator core 10 is wound with an armature winding 11 within a slot and connected to a housing 13 having a cooling passage 12 through which a coolant flows. A permanent magnet recessed type rotor 20 comprises a first rotor 20A secured to a shaft 22, and a second rotor 20B separated from the shaft 22. Note, an interior permanent magnet type or a surface magnet type rotor may be used. The first rotor 20A has a permanent magnet 21A provided with magnetic poles of sequentially different polarities in a rotational direction. Likewise, the second rotor 20B has a permanent magnet 21B provided with magnetic poles of sequentially different polarities in a rotational direction. A field magnet in which a first field magnet and two rotors of the second rotor are arranged on the same shaft are opposed to the stator magnetic pole.

The inside diameter side of the second rotor 20B functions as a nut part 23B, and a shaft threaded thereon functions as a tread (screw) part 23A of a bolt. Hence, the second rotor 20B is movable in an axial direction while rotating relative to the shaft.

Further, a stopper is provided at a location apart from the side surface of the second rotor 20B so that the second rotor 20B may not protrude exceeding a predetermined displacement or distance from the center of the stator. Further, if a stopper driving actuator 25 as a servo mechanism is provided so that the stopper 24 may be moved laterally in parallel with the shaft, a value of deviation of the pole center between the first field magnet and the second field magnet can be varied. As a result, it is possible to control the whole effective or composite magnetic flux amount comprising the first field magnet and the second field magnet relative to the stator in which the armature winding 11 is wound within the slot.

In the electric rotary machine in which fundamentally, the armature winding is used for the stator and the permanent magnet is used for the rotor, if the rotational direction of the rotor when the electric rotary machine functions as a motor is the same as that when the electric rotary machine functions as a power generator, the direction of torque received by the rotor when the electric rotary machine functions as a motor is opposite to that when the electric rotary machine functions as a power generator. If, if functions as a motor, the rotational direction of the rotor is opposite and the direction of torque is also opposite. Likewise, if the electric rotary machine functions as a power generator, the rotational direction of the rotor is opposite and the direction of torque is also opposite.

Figure 3:
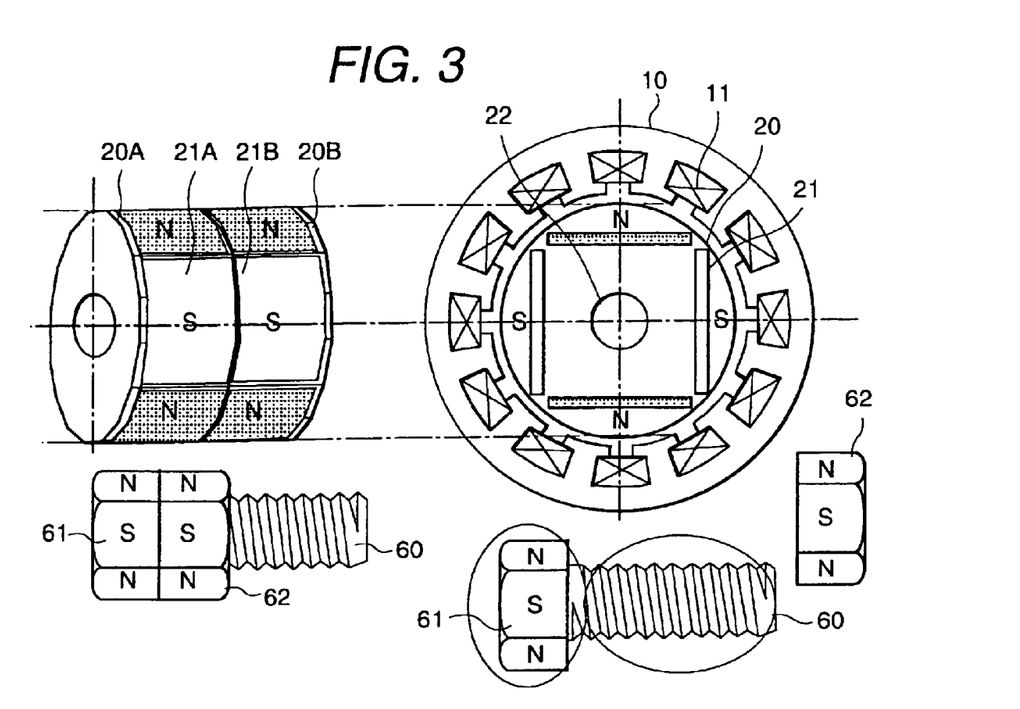
FIG. 3 illustrates the same magnetic poles of rotors of the electric rotary machine of FIG. 1 aligned on their center axes.

Hence, the electric rotary machine functions as a motor in a low rotational region as in the start of a turbine, the center of the pole of the first rotor 20A is aligned with that of the second rotor 20B, as shown in FIG. 3, to maximize the effective magnetic flux amount by the permanent magnet opposite to the stator pole, thereby obtaining the high torque characteristics. Then, when the electric rotary machine functions as a power generator, when the rotational direction of the rotor is the same as shown in FIG. 2, the torque direction received by the rotor is opposite to that when the electric rotary machine functions as a motor, and the center of the pole of the second rotor 20B is deviated while increasing the spacing between the first rotor 20A and the second rotor 20B so as to disengage the nut part from the screw part relative to the shaft 22, thereby reducing the effective or composite magnetic flux amount caused by the permanent magnet opposite to the stator magnetic pole. In other word, there is a field weakening effect, and the high output generation characteristics are obtained in the high rotational region.

Figure 4:
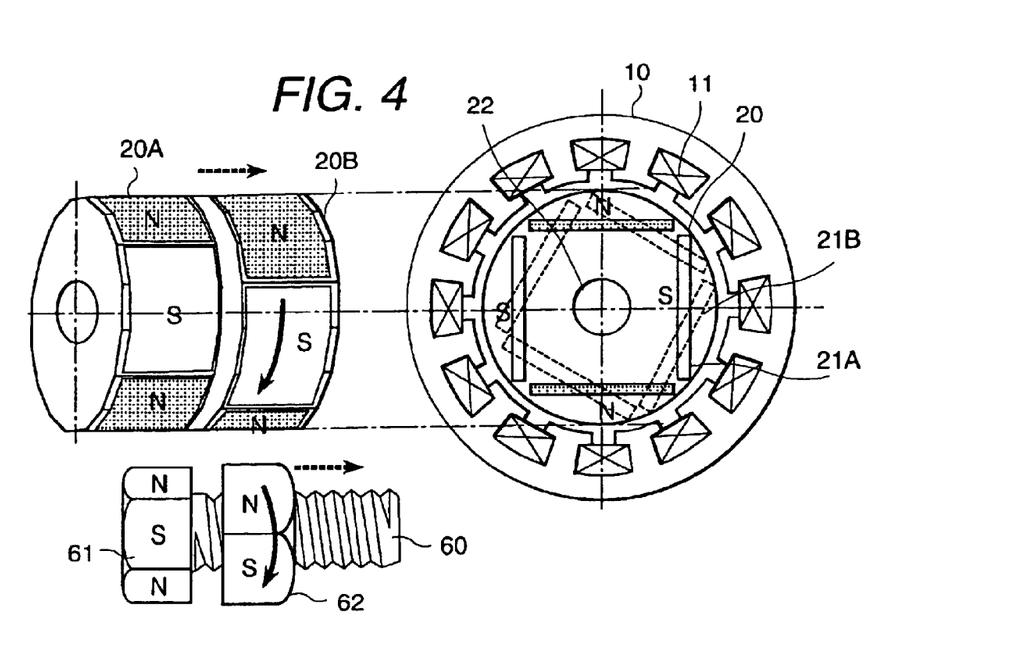
FIG. 4 illustrates the same magnetic poles of rotors of the electric rotary machine of FIG. 1 deviated on their center axes.

FIGS. 3 and 4 illustrate a relationship between a thread part 61 of a bolt, a screw part 60 of a bolt, and a nut part 62. The thread part 61 of a bolt and the nut part 62 correspond to the first rotor 20A and the second rotor 20B, respectively. If the screw part 60 of a bolt (corresponding to 23A in FIG. 2) rotates in the same direction, the nut part 62 is tightened or disengaged depending on the direction of torque applied to the nut part 62, and the second rotor 20B also functions similarly depending on the direction of torque of the rotor.

Figure 5A:
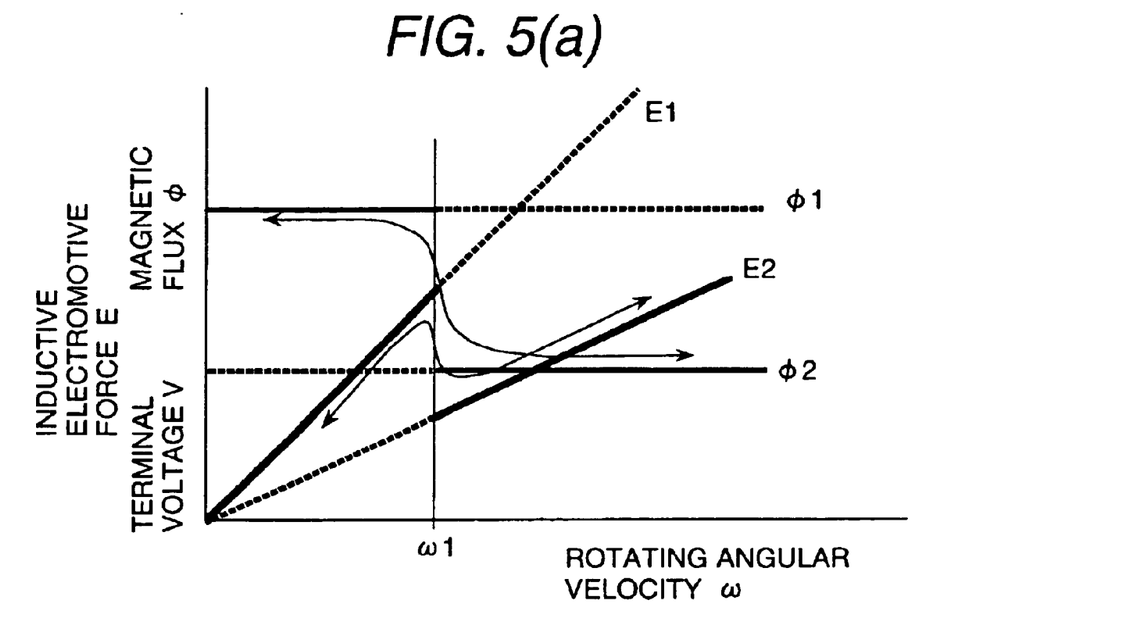
FIGS. 5A and 5B illustrates characteristics of the electric rotary machine of FIG. 1 according to the rotating angular velocity.
Figure 5B:
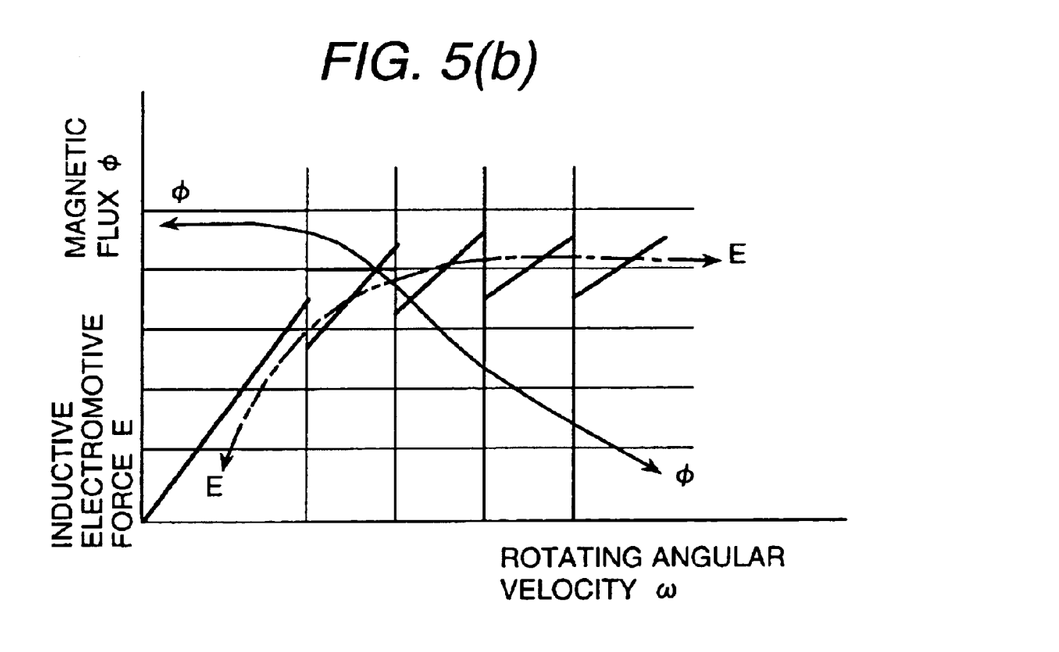

FIGS. 5A and 5B show the characteristics of the effective magnetic flux relative to the rotating angular velocity of the permanent magnet type synchronous electric rotary machine, the inductive electromotive force, and the terminal voltage. The inductive electromotive force E of the permanent magnet type synchronous electric rotary machine is determined by the magnetic flux $\Phi$ generated by the permanent magnet and the rotating angular velocity $\omega$ of the electric rotary machine. That is, as shown in FIG. 5A, if the magnetic flux $\Phi 1$ generated by the permanent magnet arranged in the rotor is constant, when the rotating angular velocity $\omega$ (rotating speed) increases, the inductive electromotive force E1 of the electric rotary machine increases in proportion thereto. However, the power supply terminal voltage or capacity of the power converter 4 has a limit, and the inductive electromotive force generated by the electric rotary machine has to be suppressed to a level lower than a certain condition. Therefore, the permanent magnet type synchronous electric rotary machine must be subjected to the so-called field weakening control for reducing the magnetic flux generated by the permanent magnet in a region in excess of a rotating speed.

Since the inductive electromotive force increases in proportional to the rotating angular velocity, a current of the field weakening control has to be also increased. It is therefore necessary to introduce a high current into a coil as a primary conductor, and heat generated by the coil naturally increases. Therefore, there is the possibility that efficiency is lowered and demagnetization of the permanent magnet in excess of cooling ability occur caused by heat generation.

For example, as shown in FIG. 5A, when the magnetic flux $\Phi 1$ generated by the permanent is changed to the magnetic flux $\Phi 2$ at a point of the rotating angular velocity $\omega 1$ (rotating speed), a change occurs from the inductive electromotive force E1 to the inductive electromotive force E2 of the electric rotary machine to enable limitation of the maximum value of the inductive electromotive force. FIG. 5B likewise schematically shows the state when the magnetic flux $\Phi$ is finely changed according to the rotating angular velocity ω (rotating speed), the inductive electromotive force E can also be constantly maintained.

In the present invention, the rotor divided into the first field magnet and the second field magnet of the electric rotary machine is arranged on the same shaft and the pole center of the first field magnet and the second field magnet is changed depending upon the direction of the rotational torque, in which when the electric rotary machine functions as a motor in a low rotation region as in the start of a turbine, the center of the magnetic poles of the first rotor and the second rotor are aligned to increase the effective magnetic flux amount caused by the permanent magnet opposed to the stator magnetic pole, thus obtaining the high torque characteristics. Next, when the electric rotary machine functions as a power generator, when the rotational direction of the rotor is the same, the torque direction received by the rotor is opposite to that when the electric rotary machine functions as a motor so that the center of the same magnetic pole of the first rotor and the second rotor is deviated to reduce the effective magnetic flux amount caused by the permanent magnet opposite to the stator magnetic pole. In other words, there is a field weakening effect, and the high output generation characteristics are obtained in a high rotation region.

Further, as one embodiment of means for obtaining the characteristics shown in FIG. 5B, there can be used an electric rotary machine in which the first field magnet is secured to the shaft, the second field magnet is connected movably to the shaft, the shaft has a screw part of a bolt, and the second field magnet has a nut part on the inner peripheral side thereof, which are connected with a screw function, a stopper is provided at a location apart from the side of the second field magnet, and a servo mechanism in which the stopper is variable in a parallel direction with the shaft according to the rotating speed.

Figure 6:
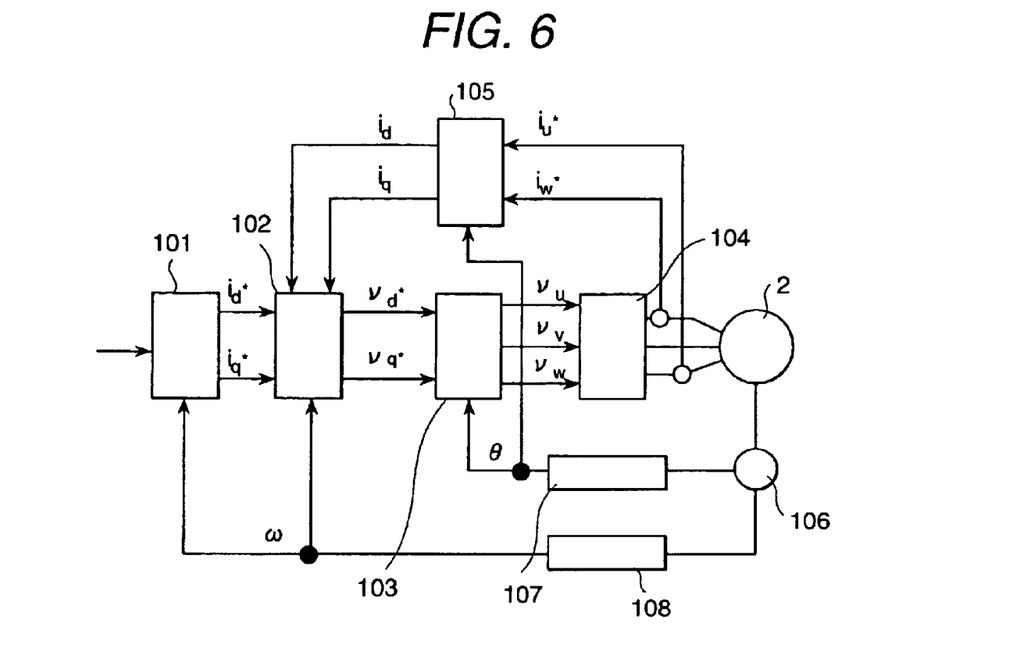
FIG. 6 is a control block diagram of the electric rotary machine of FIG. 1.

In FIG. 6, on the basis of information (such as compressor pressure, gas temperature, operating mode, and opening degree of a throttle for fuel gas) from a turbine controller and a sensor installed singly, and the rotating speed of the permanent magnet type synchronous electric rotary machine 2, an operation judgment part 101 judges the operation of the permanent magnet type synchronous electric rotary machine 2 to output a current instruction value. The current instruction value output from the operation judgment part 101 is input in a current control block 102 for carrying out non-interference control relative to a difference relative to the present current value of the permanent magnet type synchronous electric rotary machine 2.

Output from the current control block 102 is converted into a 3-phase AC by a rotation coordinate converter 103 to control the permanent magnet type synchronous electric rotary machine 2 through a PWM inverter main circuit 104. Further, various phases of current (at least a 2-phase current) and rotating speed (turbine rotating speed) of the permanent magnet type synchronous electric rotary machine 2 are detected, and various phases of currents are converted into a biaxial current by a biaxial conversion block 105 and fedback to a current instruction value. If there is a transmission, a value obtained by multiplying the turbine rotating speed by two-fold may be used. Further, the rotating speed, the pole position or the like is detected by a detector 106 and fedback to various control blocks through the pole position converter 107 and a speed converter 108.

While in the embodiment shown in FIG. 6, illustration is made of a case where a position and speed sensor of the electric rotary machine 2 and a current sensor of the electric rotary machine are present, it is noted that even the control constitution of the type in which a part of these sensors is eliminated and the electric rotary machine 2 is driven without a sensor, can be made. Further, in the permanent magnet type electric rotary machine according to the present invention, the center of both poles of the first rotor and the second rotor may be aligned or deviated depending on the operating state. Therefore, it has a function for correcting an advance of a current supply by a controller for controlling the power converter according to a deviation of a composite pole position of the first field magnet and the second field magnet.

Figure 13:
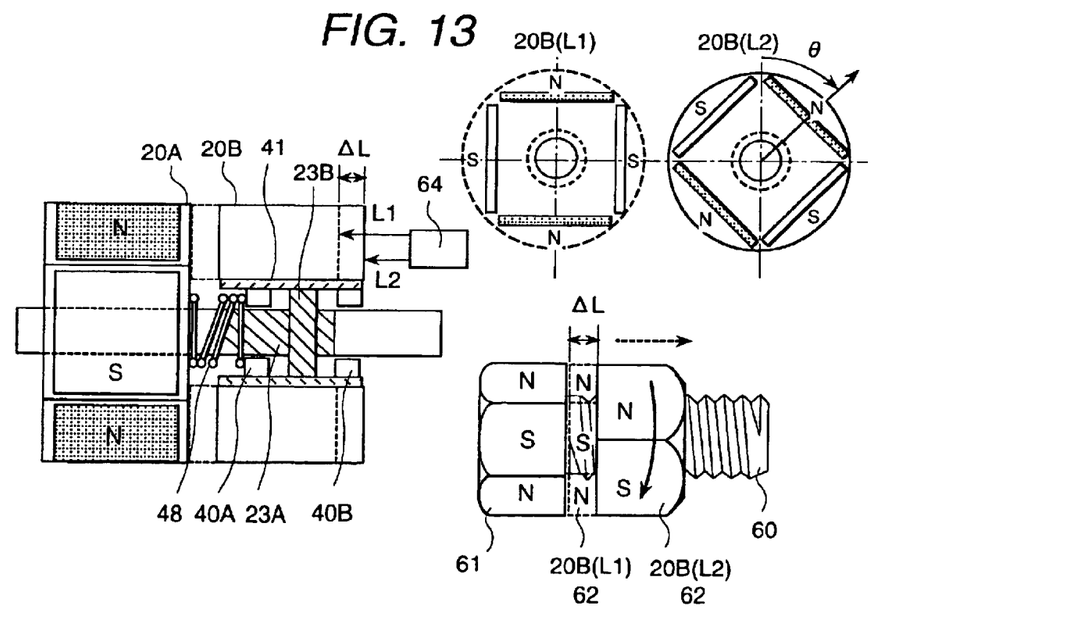
FIG. 13 illustrates a measurement of axial displacement of an electric rotary machine according to another embodiment of the present invention.

In FIG. 13, a rotational angle θ and the axial displacement amount ΔL of the second rotor are in a proportional relation, and the axial displacement amount ΔL is measured using a displacement measuring unit 64 and fedback to a controller of the power converter to obtain a value exchanged to a deviation angle of the composite pole position of the first field magnet and the second field magnet, which is used for optimum control for correcting an advance of a supply of current.

Figure 7:
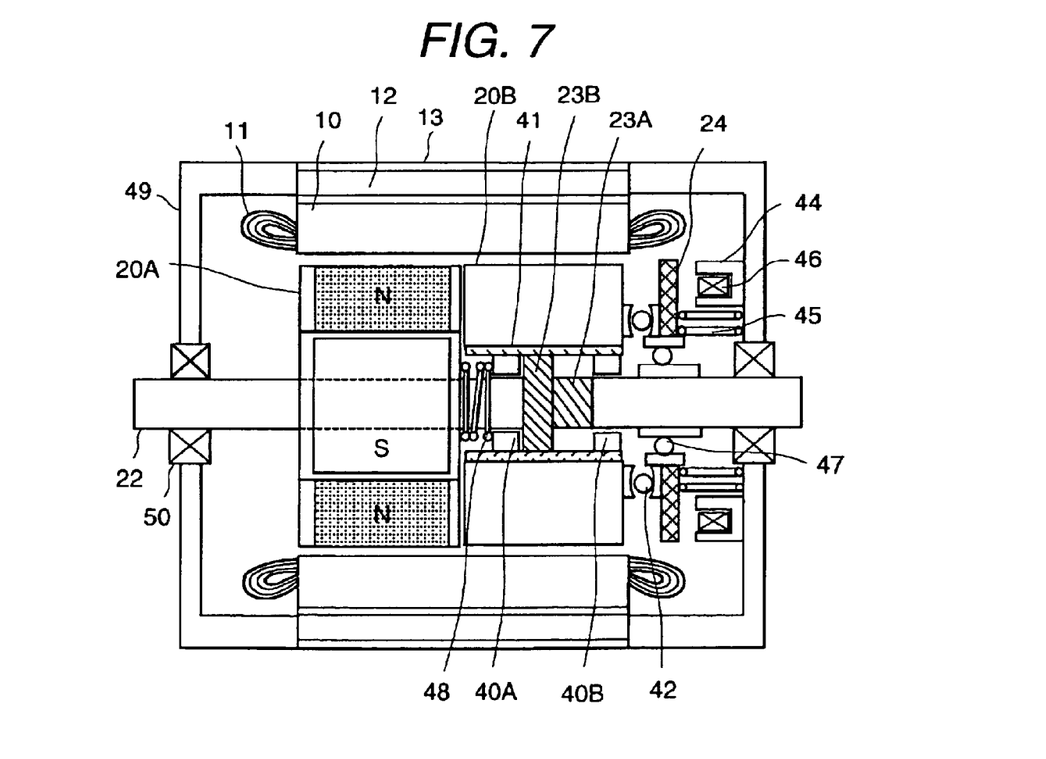
FIG. 7 illustrates an electric rotary machine in a state where an actuator is OFF according to a further embodiment of the present invention.

In FIG. 7, the first rotor 20A is secured to the shaft 22, the second rotor 20B is connected movably to the shaft 22 and a screw part 23A of a bolt is secured to a part of the shaft. A sleeve 41 is secured to the inner peripheral side of the second field magnet, and a nut part 23B is secured to the inside of the sleeve 41, which are integrated. Then the second rotor 20B rotates relative to the shaft 22 in a direction in which the nut part is disengaged from the screw part of a bolt while enlarging a spacing between the first rotor 20A and the second rotor 20B.

When an interlinkage magnetic flux change occurs between the inner peripheral side of the second field magnet and the shaft 22 as rotation occurs due to the presence of a slight play or slack, there is a problem with electric corrosion. The sleeve 41 is formed of non-magnetic material which is higher in electric resistivity than iron, and thereby there is exhibited an effect that magnetic and electrical insulation is provided between the inner peripheral side of the second field magnet and the shaft 22.

Support mechanisms 40A and 40B are provided internally of the sleeve 41 so that rotational motion, reciprocating motion and composite motion may be guided between the second field magnet and the shaft. In the second rotor 20B, a part of the shaft is provided with a screw part 23A of a bolt, and a function of a screw is provided therewith and a movable stopper 24 is provided at a location apart from the side of the second field magnet. Support mechanisms 42 and 47 are provided between the stopper 24, the shaft and between the stopper 24 and the side surface of the second rotor 20B so that rotational motion, reciprocating motion and composite motion may be guided. The support mechanism 42 has a function of a thrust bearing, and the support mechanism 47 has a function for guiding rotational motion, reciprocating motion and composite motion while being a radial bearing. Further, with spring 48, the support mechanism 42 is allowed to enhance its function as a trust bearing.

For the construction of the electromagnetic clutch, a coil 46 is wound about a yoke 44 and the stopper 24 may also serve as a function of a movable core. The yoke 44 and the coil 46 are secured to a frame 49 of the electric rotary machine or to a part of a vehicle body (not shown), and a spring 45 is provided between the yoke 44 and the stopper 24 to provide a function of a return device at energization cutoff. A bearing 50 is provided between the frame 49 and the shaft 22 of the electric rotary machine for support.

Figure 8:
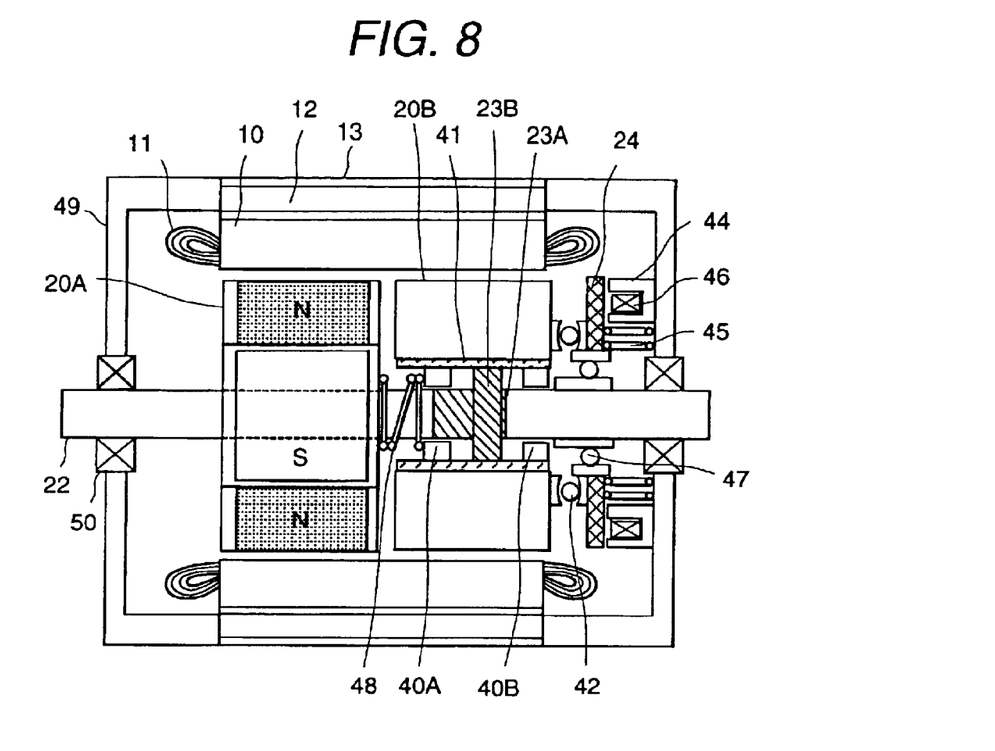
FIG. 8 illustrates an electric rotary machine in a state where an actuator is ON according to a further embodiment of the present invention.

FIG. 7 schematically shows the non-energizing state of the coil 46, and FIG. 8 schematically shows the energizing state of the coil 46. When the coil 46 is energized, the yoke 44 becomes a powerful electromagnet to attract the stopper 24 which also functions as a movable iron. The electromagnetic clutch shown here is one example of a servo mechanism variable in parallel with the shaft, and a hydraulic actuator, a linear driving device using a rotary machine or a ball screw, or a linear motor is used to enable fine locating of a stopper.

Figure 9:
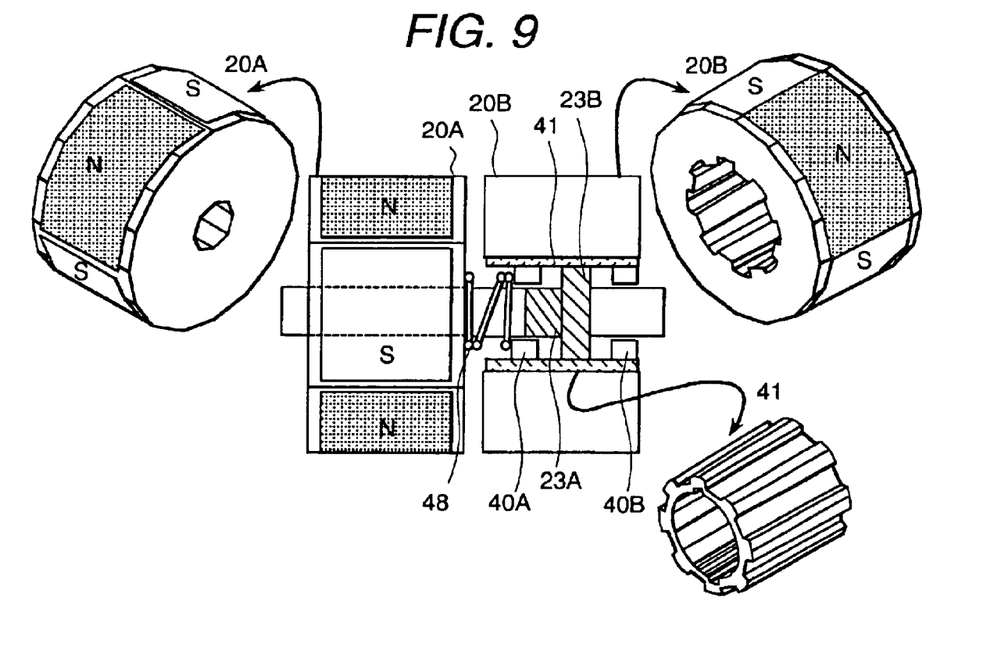
FIG. 9 illustrates the inside of a rotor of an electric rotary machine according to a further embodiment of the present invention.

FIG. 9 shows one example of a sleeve 41 secured to the inside of the second rotor 20B. As one method for securing them, concavo-convexes are provided on a surface with which two parts of the second rotor 20B and the sleeve 41 come into contact. There is further shown a difference of the inside of the first rotor 20A secured to the shaft 22 and the second rotor 20B separated from the shaft 22.

Figure 10:
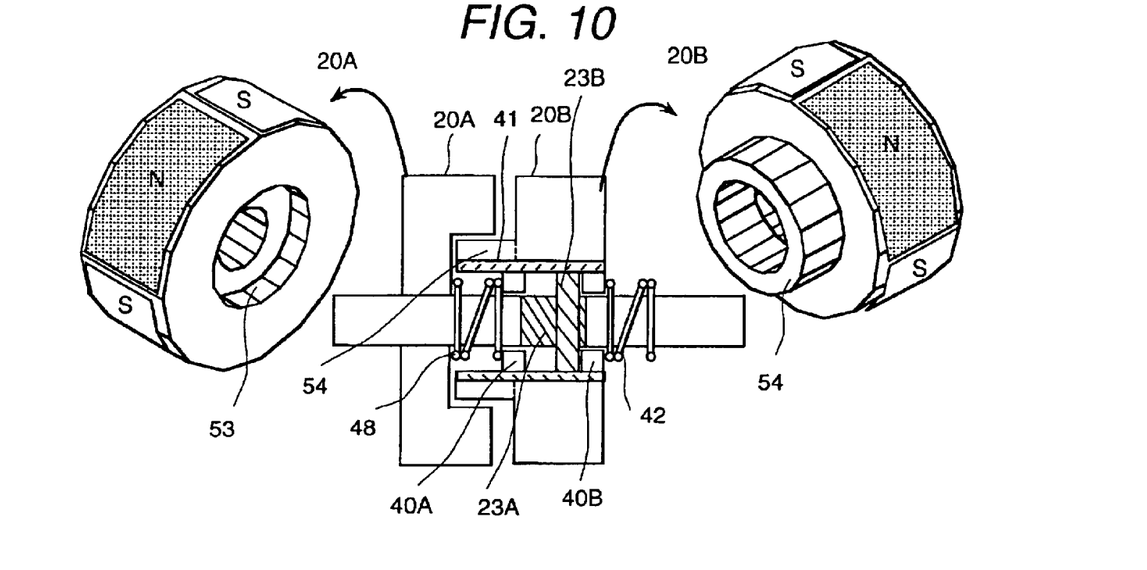
FIG. 10 illustrates the inside of a rotor of an electric rotary machine according to another embodiment of the present invention.

In FIG. 10, a recess part 53 is provided in the side surface of the first field magnet in which the first field magnet comes in contact with the second field magnet, and a protrusion 54 which also functions as the sleeve is provided on the second field magnet. The protrusion 54 may be integrated with the sleeve 41 or may be integrated with the second rotor 20B. Thus, enough space can be secured for the sleeve 41 and the spring 48, the support mechanisms 40A and 40B, and the nut part 23B. This is an effective technique for the electric rotary machine having a thin axial laminated thickness of the second rotor 20B.

Figure 11:
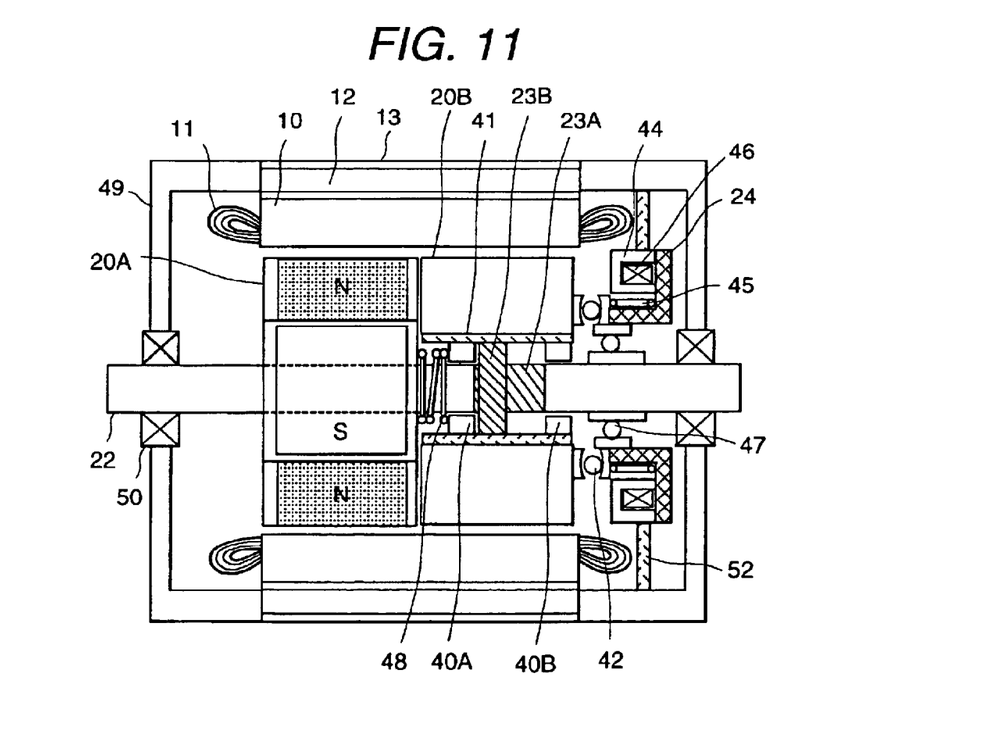
FIG. 11 illustrates an electric rotary machine in a state where an actuator is ON according to another embodiment of the present invention.

In FIG. 11, the basic elements shown in FIG. 11 are the same as those of FIG. 7, but the electromagnetic clutch is modified. In FIG. 11, the coil 46 is in an energized state, and at the time of energization cutoff, the yoke 44 is separated from the stopper 24 by the spring 45. The present embodiment obtains thrust by a screw function caused by mutual action of the screw part 23A in which torque is applied to the second rotor 20B and the nut part 23B. If thrust for extruding the stopper 24 due to the mutual relation between the screw and the torque is applied, when the energization of the coil 46 is cutoff, the stopper 24 is disengaged from the yoke 44. The yoke 44 is secured to the frame 49 through an arm 52. The electromagnetic clutch shown in FIG. 11 is one example of a servo mechanism in which the stopper 24 is variable in parallel with the shaft similarly to the description of FIGS. 7 and 8, and a hydraulic actuator, a linear driving device using an electric rotary machine and a ball screw or a linear motor is used to enable finer locating of the stopper.

Figure 12:
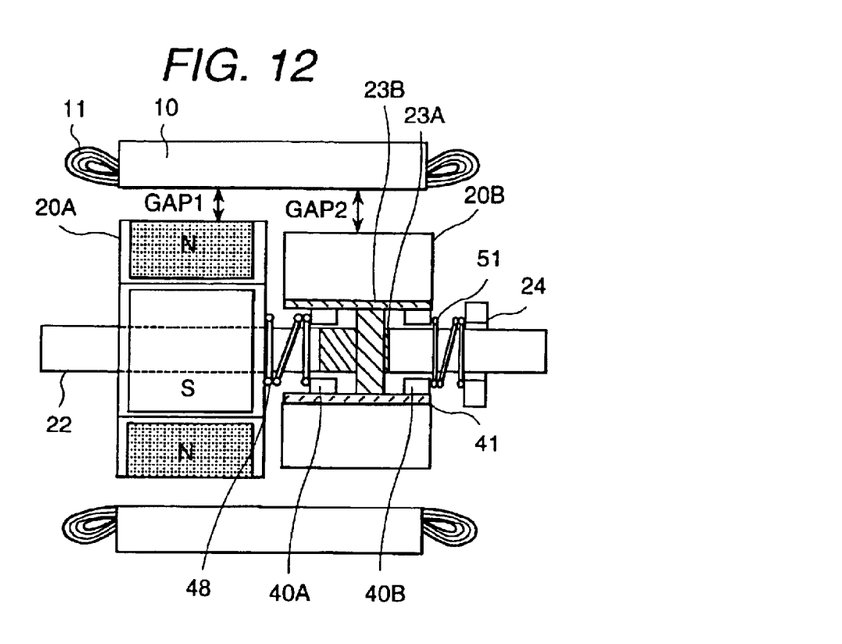
FIG. 12 illustrates a rotor of an electric rotary machine according to another embodiment of the present invention.

In FIG. 12, the first rotor 20A is firmly secured to the shaft 22 whereas the second rotor 20B has a freedom of movement with respect to the shaft 22. Accordingly, there is a slight mechanical dimensional play between the second rotor 20B and the shaft 22, and when a large torque or a centrifugal force is applied, the eccentricity may sometimes occur. Therefore, the air gap Gap2 between the second rotor 20B having the second field magnet and the stator is made larger than the air gap Gap1 between the first rotor 20A having the first field magnet and the stator, thereby providing an effect of omitting a mechanical connection between the second rotor 20B and the stator caused by the eccentricity.

Figure 15:
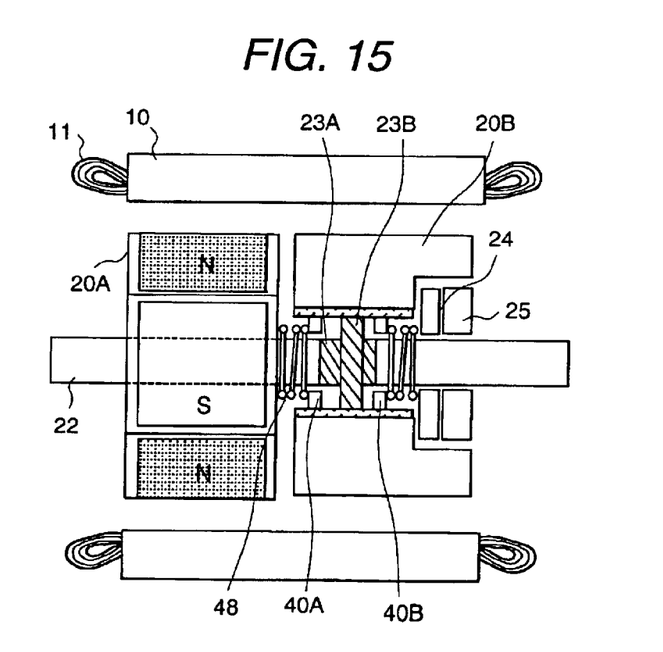
FIG. 15 illustrates a rotor of an electric rotary machine according to still another embodiment of the present invention.

In FIG. 15, the length of the inner peripheral side of the second rotor 20B is made shorter than the outer peripheral side thereof, and a stopper 24 and a servo mechanism 25 are provided internally of the second rotor 20B. Thus, restricting the axial length of the whole rotor caused by the stopper 24 and the servo mechanism 25.

Hence, the present invention provides an electric rotary machine including a rotor having a field magnet provided on a shaft. The field magnet comprising a first field magnet with magnetic poles of sequentially different polarities arranged in a rotational direction, a second field magnet with magnetic poles of sequentially different polarities arranged in a rotational direction and the second field magnet is rotatable on the shaft and displaced axially with respect to the first field magnet.

Figure 14:
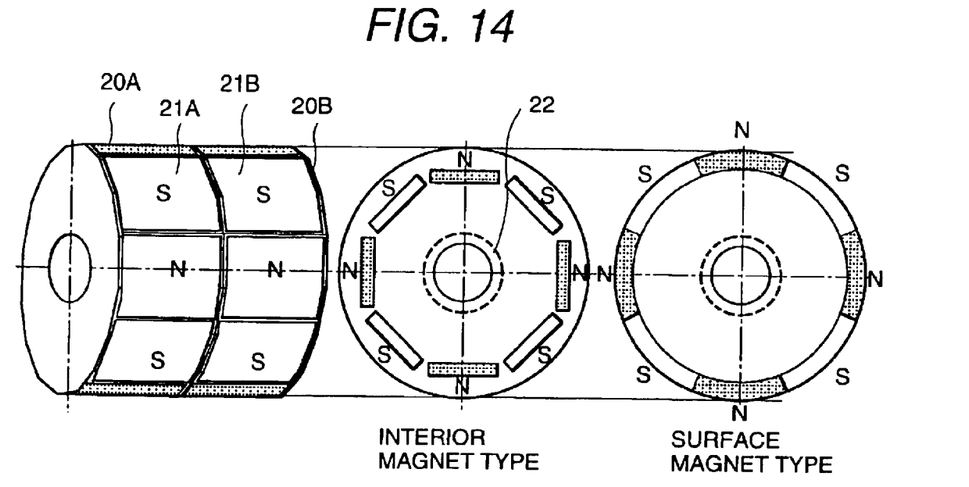
FIG. 14 illustrates a rotor of an electric rotary machine according to another embodiment of the present invention.

Although the invention has been described above in connection with exemplary embodiments, it is apparent that many modifications and substitutions can be made without departing from the spirit or scope of the invention. For example, although the present invention has been described utilizing the 4-pole machine, the invention can also be applied to a 2-pole, 6-pole or more machine. As one example, FIG. 14 is a schematic view of a stator of a permanent magnet type electric rotary machine in a case where the present invention is applied to an 8-pole machine. Further, an interior permanent magnet type or a surface magnet type can be applied to the rotor. Accordingly, the invention is not to be considered as limited by the foregoing description, but is only limited by the scope of the appended claims.

What is claimed as new and desired to be protected by Letters Patent of the United States is:

1. A power generation system, comprising:
   a compressor for compressing a medium comprising taken-in air and supplied fuel;
   a combustor for burning the medium compressed by said compressor;
   a turbine that is rotated by receiving the medium burned by said combustor;
   an electric rotaly machine mechanically connected to said turbine, said electric rotary machine including:
      a stator having a primary winding and a stator magnetic pole;
      a rotor having a field magnet facing said stator magnetic pole and a shaft; and
      a displacement mechanism provided on said rotor;
   a power converter electrically connected to said electric rotary machine; and
   a controller for controlling said power converter;
   wherein said field magnet comprises:
   a first field magnet with magnetic poles of sequentially different polarities arranged in a rotational direction; and
   a second field magnet rotatable with respect to said first field magnet, and having magnetic poles of sequentially different polarities arranged in a backward rotational direction;
   wherein said displacement mechanism displaces said second field magnet in an axial direction and in a rotational direction with respect to said first field magnet in accordance with a balance between a magnetic acting force between said first field magnet and said second field magnet, and a direction of torque generated in said rotor;
   wherein when said turbine is started, and said electric rotary machine is operated as an electric motor to elevate the speed of said turbine from zero to the self-sustaining speed of said turbine, the same magnetic pole centers of said first field magnet and said second field magnet are located in a line in accordance with the balance between the magnetic acting force between said first field magnet and said second field magnet, and the direction of rotating torque generated in said rotor; and wherein when said turbine operates at a speed in excess of the self-sustaining speed, and said electric rotary machine is operated as a generator to generate power, the direction of rotating torque generated in said rotor is reversed to thereby allow the same magnetic torque center positions of said first field magnet and said second field magnet to deviate from each other.

2. The power generation system of claim 1, wherein said first field magnet is secured to said shaft, said second field magnet is provided movably relative to said shaft, and said second field magnet and said shaft are connected to each other by a thread function comprising a relation between a bolt function provided for said shaft and a nut function provided for said second field magnet.

3. The power generation system of claim 2, wherein a stopper for preventing said second field magnet from being displaced in excess of a fixed level is provided on a side of said second field magnet, and said stopper is movable in parallel with said shaft.

4. The power generation system of claim 3, wherein said stopper is moved by a servo mechanism in parallel with said shaft in accordance with the rotational speed.

5. The power generation system of claim 4, wherein said stopper and said servo mechanism are provided on the inner circumferential side of said second field magnet.

6. The power generation system of claim 3, wherein said stopper is provided with a support mechanism for guiding rotating motion, reciprocating motion and composite motion with respect to said second field magnet and said shaft.

7. The power generation system of claim 2, wherein a plurality of support mechanisms for guiding rotating motion, reciprocating motion and composite motion are provided between said second field magnet and said shaft.

8. The power generation system of claim 2, wherein a sleeve for electrically and magnetically insulating said second field magnet from said shaft is provided therebetween, and said sleeve is secured on the inner circumferential side of said second field magnet.

9. The power generation system of claim 8, wherein said sleeve is a non-magnetic material, which is higher in electrical resistivity than iron.

10. The power generation system of claim 2, wherein springs for guiding rotating motion, reciprocating motion and composite motion of said second field magnet are provided before and behind said second field magnet, respectively.

11. The power generation system of claim 2, wherein said first field magnet is provided with a recess on a side thereof in contact with said second field magnet, the second field magnet is provided with a projection on a side thereof in contact with said first field magnet, and said projection also serves as a sleeve for insulating said second field magnet from said shaft electrically and magnetically.

12. The power generation system of claim 2, wherein an air gap between a rotor of said second field magnet and said stator is larger than an air gap between a rotor having said first field magnet and said stator.

13. The power generation system of claim 1, wherein said controller controls a displacement angle of a current supply according to the deviation of a composite magnetic pole position of said first field magnet and said second field magnet.

14. The power generation system of claim 1, wherein said controller controls a displacement angle of a current supply according to the deviation angle of a composite magnetic pole position of said first field magnet and said second field magnet.

* * * * *